June 12, 1934.  D. R. KAUTZ  1,962,659

MOTION TRANSMITTING MECHANISM

Filed Dec. 13, 1930

INVENTOR.
Delton R. Kautz
BY Allen & Allen
ATTORNEYS.

Patented June 12, 1934

1,962,659

UNITED STATES PATENT OFFICE 1,962,659

MOTION TRANSMITTING MECHANISM

Delton R. Kautz, Norwood, Ohio

Application December 13, 1930, Serial No. 502,107

4 Claims. (Cl. 172—284)

My invention is addressed to motion transmitting devices, which, while having utility wherever similar problems arise, are especially useful in connection with the projection of motion pictures and reproduction of sound from sound records of some form on the film itself. Here, the film is first run through a projection apparatus, and then through an apparatus for the reproduction of sound. Inasmuch as the nature of projection apparatus produces a somewhat jerky and irregular motion of the film, and inasmuch as this irregular motion imparts itself to the driving means, it is necessary, if the sound reproduction device is to be operated from the same source of power, to filter out the irregular components of motion from the members which control the movement of the film past the sound pick-up mechanism. Since there must be synchronism in the movement of the film in each device, some mechanical connection is substantially necessary; and the primary object of my device is the provision of means for transmitting motion in complete synchronism but quite free of minor variations and irregularities.

Another object of my invention is the provision of motion transmitting means having a filtering action which, while maintaining say, the same rotative relationship between a driving and driven shaft, will transmit to the driven shaft a smooth motion although the motion of the driving shaft is subject to considerable irregularities.

A more specific object of my invention is the provision of a drive for the sound reproducing instrumentalities of a talking-motion picture apparatus such as will insure a smooth and steady passage of the film through a sound reproducer in synchronism with the passage of the said film through a projector.

These and other objects of my invention, which shall be pointed out hereinafter, or will be apparent to one skilled in the art upon reading these specifications, I accomplish by that certain construction and arrangement of parts of which I shall now describe an exemplary embodiment, reference being had to the drawing which accompanies these specifications.

In the drawing:—

Figure 2:
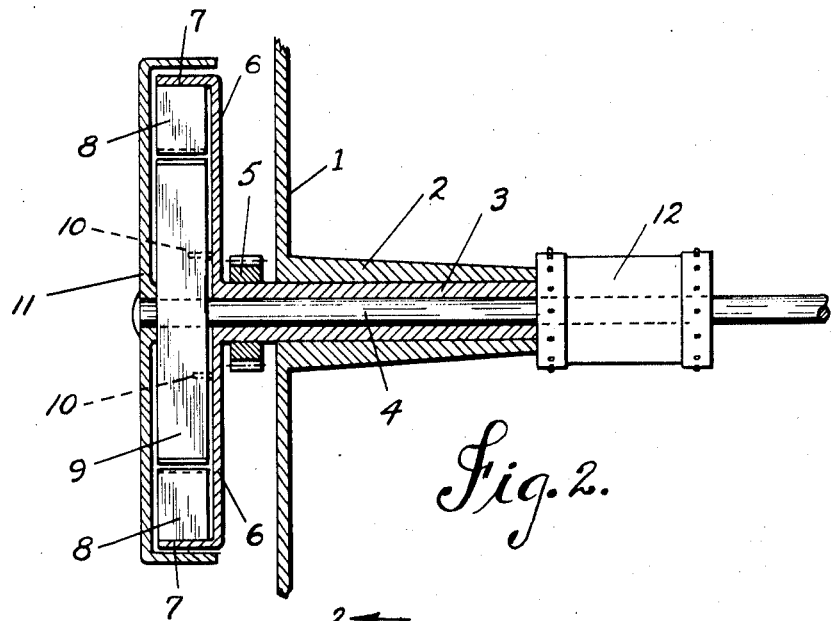
Figure 2 is a sectional view of my device.
Figure 1:
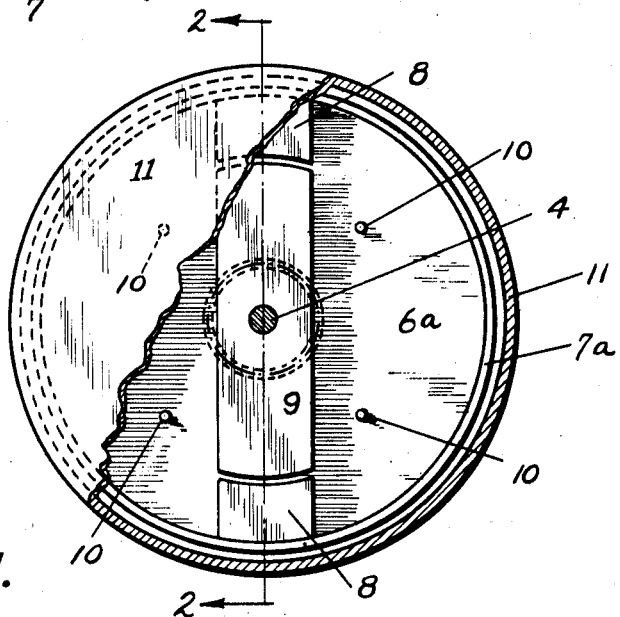
Figure 1 is a plan view of my motion transmitting device.

In my invention, I provide a magnetic mechanical filter and motion transmitting mechanism, in which either the driving or driven member has magnetic means attracting other means in the opposite member, there being no other continuously effective mechanical connection between the two. In the embodiment shown, the frame of a sound-reproducing device is indicated at 1. This frame bears a journal sleeve or bearing 2. A driving member 3 is journalled in this sleeve, and is tubular in form. A driven shaft 4 extends through the center bore of the tubular member 3 and is effectively journalled therein, the members 3 and 4 being rotatable with respect to each other. The driving member 3 bears a suitable gear or other device 5, through which it receives driving motion from the moving mechanism of the projector. Beyond the bearing portion, the driving member 3 has a pair of opposite extensions 6, with turned over ends 7, to which iron blocks, or blocks of other suitable magnetic material 8 are attached as shown. Instead of being separate extensions, the members 6 may form part of a continuous disc 6a, and the turned over portions 7 may form part of a continuous flange 7a, thereby producing a cup-like formation on the end of the tubular portion of the driving member 3. I prefer the cup-like formation of the driving member.

To the driven shaft I attach non-rotatably a magnet 9, the poles of which approach the attraction blocks 8 quite closely, but without touching. The attraction between the magnet and these blocks constitutes the medium by which force is transmitted from the driving to the driven medium; and it will be evident, inasmuch as there is no direct mechanical connection between the driving and driven members, that the transmission of motion will be accompanied by a filtering action, since the magnet and attraction blocks may move relatively to each other under the stress of sudden motion variations. To prevent the magnet swinging in either direction beyond a point at which its effective attraction for the blocks constitutes an adequate driving torque, as well as to prevent any absolute loss of synchronism between the driving and driven members, I provide stop pins 10 on the portions 6 of the driving member. To the end of the driven shaft 4, I also prefer to fasten non-rotatably a cup-shaped device 11, the flange of which covers the mechanism comprising magnet and attraction blocks. This cup 11 not only protects the other mechanism from dust and dirt, but because it is fairly heavy, acts as a fly wheel, and by its inertia steadies the motion of the shaft 4 and aids the filtering action. The usual sprocket 12 for the movement of the film is attached to the shaft 4 as shown; and the shaft may have a second bearing located in the frame of the device beyond the sprocket where desired.

The operation of my device will be clear from the foregoing description; and it will be clear that modifications may be made in it without departing from the spirit of my invention. Any number of magnets and attraction blocks may be used, for example, arranged in any desired manner between portions of the driving and driven members; and magnets may be substituted for the attraction blocks. The driving and driven members may be mounted in separate bearings upon opposite sides of my motion transmitting mechanism. Other modifications within the scope of my invention may be made.

Having thus described my invention, what I claim as new and desire to secure by Letters Patent, is:

1. In a motion transmitting device, a driving means having a cup-shaped member and a driven means also having a cup-shaped member, the cylindrical portions of said cup-shaped members overlapping and magnetic means wholly within the inner one of said cup-shaped members serving as means for transmitting motion from one to the other.

2. In a motion transmitting device, supporting means comprising a bearing, a driving member having a hollow spindle supported in said bearing and having extensions bearing magnetic means, a driven shaft supported in the hollow spindle of said driving means and bearing magnetic means located adjacent said first mentioned magnetic means whereby motion may be transmitted from said driving means to said driven means by the attraction of said magnetic means, and stop means on said driving means to limit the rotation of said driving means with respect to said driven means, said driven means bearing a cup-shaped member serving as a fly wheel and surrounding said magnetic means.

3. In a device for transmitting motion, supporting means comprising a bearing, driving means comprising a hollow spindle supported in said bearing and a cup-shaped member on said spindle bearing magnetic attraction blocks, means on said driving member to impart motion thereto, a driven member comprising a shaft journalled in said hollow spindle, magnetic means non-rotatably affixed to said shaft and cooperating with said attraction blocks, a cup-shaped member non-rotatably attached to said shaft and surrounding said first mentioned cup-shaped member acting as a fly wheel for said shaft and a sprocket on said shaft for the movement of motion picture film.

4. In a device for transmitting motion, supporting means comprising a bearing, driving means comprising a hollow spindle supported in said bearing and a cup-shaped member on said spindle bearing magnetic attraction blocks, means on said driving member to impart motion thereto, a driven member comprising a shaft journalled in said hollow spindle, magnetic means non-rotatably affixed to said shaft and cooperating with said attraction blocks, a cup-shaped member non-rotatably attached to said shaft and surrounding said first mentioned cup-shaped member acting as a fly wheel for said shaft and a sprocket on said shaft for the movement of motion picture film, and pins on said first mentioned cup-shaped member to limit the rotation of the magnetic means on said shaft with respect thereto.

DELTON R. KAUTZ.